US010382613B2

(12) United States Patent
Singh et al.

(10) Patent No.: US 10,382,613 B2
(45) Date of Patent: Aug. 13, 2019

(54) SOCIAL ALARMS AND REMINDERS

(71) Applicant: Acintyo, Inc., McLean, VA (US)

(72) Inventors: Pradeep Singh, McLean, VA (US);
Ashish Deopura, McLean, VA (US);
Varun Gupta, Jhajjar (IN); Poonam Singh, McLean, VA (US); Vinod Jeyachandran, Potomac, MD (US);
Aaditya Singh, McLean, VA (US);
Kritika Singh, McLean, VA (US)

(73) Assignee: Acintyo, Inc., McLean, VA (US)

(*) Notice: Subject to any disclaimer, the term of this patent is extended or adjusted under 35 U.S.C. 154(b) by 0 days.

(21) Appl. No.: 16/021,285

(22) Filed: Jun. 28, 2018

(65) Prior Publication Data

US 2019/0007545 A1    Jan. 3, 2019

Related U.S. Application Data

(60) Provisional application No. 62/528,018, filed on Jun. 30, 2017.

(51) Int. Cl.
*H04L 29/08* (2006.01)
*H04M 1/725* (2006.01)
*G06F 3/0484* (2013.01)
*H04L 12/58* (2006.01)

(52) U.S. Cl.
CPC .... *H04M 1/72566* (2013.01); *G06F 3/04842* (2013.01); *G06F 3/04847* (2013.01); *H04L 51/02* (2013.01); *H04L 51/32* (2013.01); *H04L 67/26* (2013.01)

(58) Field of Classification Search
CPC ............ H04M 1/72566; G06F 3/04842; G06F 3/04847; H04L 51/02; H04L 51/32; H04L 67/26; H04L 67/1046; H04L 67/1048
USPC ........................................ 455/412.2
See application file for complete search history.

(56) References Cited

U.S. PATENT DOCUMENTS

| | | | | |
|---|---|---|---|---|
| 9,274,672 B1* | 3/2016 | Huang | .................. | G06F 3/0481 |
| 9,715,820 B1* | 7/2017 | Boss | .................. | H04L 67/1046 |
| 2013/0259216 A1* | 10/2013 | Adzhamyan | ...... | H04M 3/42229 |
| | | | | 379/201.02 |
| 2013/0307681 A1* | 11/2013 | Borg | .................. | G06Q 10/109 |
| | | | | 340/517 |
| 2013/0311167 A1* | 11/2013 | Borg | .................. | G06Q 10/109 |
| | | | | 704/9 |
| 2014/0070945 A1* | 3/2014 | Dave | ...................... | G08B 21/24 |
| | | | | 340/540 |
| 2014/0100904 A1* | 4/2014 | Wolf | .................. | G06Q 10/1095 |
| | | | | 705/7.19 |

(Continued)

*Primary Examiner* — Nathan S Taylor
(74) *Attorney, Agent, or Firm* — Brian Detwiler

(57) ABSTRACT

Embodiments of the present invention include a multi-user, multi-device alarm system, which, according to some embodiments, maintains the confirmation status of the alarm creator and participants, any communications between the alarm creator and participants, and user management functionality. Embodiments include systems and methods for configuring and executing different types of alarms, including personal alarms, group alarms, buddy alarms, and team alarms. The same or alternative embodiments may include cascading notifications to participants of an alarm until the alarm creator or one of the participants marks the alarm as done.

7 Claims, 6 Drawing Sheets

(56) References Cited

U.S. PATENT DOCUMENTS

2016/0094979 A1* 3/2016 Naik .................. H04W 8/18
                                                    455/414.1
2016/0358455 A1* 12/2016 Ball .................... G01S 5/00

* cited by examiner

SOCIAL ALARMS AND REMINDERS

This application claims the benefit of U.S. Provisional Patent Application 62/528,018, filed 30 Jun. 2017.

BACKGROUND AND SUMMARY OF THE INVENTION

An alarm clock is intended to alert an individual at a specified time. Traditionally, an alarm clock has been used to wake up in the morning. But with increasingly hectic schedules, overlapping meetings, and responsibilities at work and at home, time management has become a necessity. Every day, people need to arrive at work or school on time, attend important meetings, remember important social events, and take medications. The consequences of arriving late or simply forgetting certain activities can be significant.

Fortunately, with advances in digital technology (e.g., computers offering richer and simpler user interfaces) and the proliferation of mobile devices (e.g., smartphones, tablets, digital watches), setting alarms is easier than ever. People now rely on alarms not just for waking up in the morning, but also to get reminders for tasks and events. Many new mobile phones feature some form of a built-in alarm clock, and many tools and apps exist for managing to-do lists and reminders.

But setting alarms is only part of the solution to effective time-management. An alarm is only effective if it triggers the desired action. In daily practice, people commonly set multiple alarms or hit the snooze button because they do not want to be interrupted when the alarm goes off. In other words, ignoring alarms becomes a habit, and alarms lose significance and become ineffective. Accordingly, a better failsafe is needed to ensure that alarms have the desired effect.

Another challenge that many people face today is managing group events and activities. Many people use calendar-based systems (e.g., Microsoft Outlook or Google Calendar) for these tasks. These systems can work well within a single business or family unit where everyone uses the same system, but they are ineffective when people use different calendar systems. Additionally, traditional calendar systems are designed first and foremost to organize blocks of time. Alarm functionality is an afterthought, and for simple group-based alarms, a calendar system is far too cumbersome and complex. Accordingly, a solution is needed that is not tied to a traditional calendar system, but lets people organize and manage group alarms across multiple devices and platforms in a straightforward manner.

Embodiments of the present invention are directed to systems and methods for configuring and executing alarms. This includes creating alarms (by the "alarm creator"), inviting others to participate in alarms ("participants"), and generating notifications to alert the alarm creator and participants.

Embodiments of the invention include a multi-user, multi-device alarm system, which, according to some embodiments, maintains the confirmation status of the alarm creator and participants, any communications between the alarm creator and participants, and user management functionality.

Embodiments of the invention also utilize "personal alarms," "group alarms," "buddy alarms," and/or "team alarms." With a "personal alarm," the alarm creator can invite participants to act as backups. When invited, embodiments alert each participant via a notification, and the participant can accept or decline their participation. When the alarm goes off, embodiments first alert the alarm creator. If the creator does not mark the alarm as "done" within a certain amount of time, embodiments alert the participants who accepted the invitation in a sequential fashion, so that they can remind the alarm creator (e.g., by using an internal chat feature, SMS message, phone call, etc.) to address the task that is the subject of the alarm. In embodiments, a personal alarm cannot be dismissed until the alarm creator marks it as "done." Personal alarms provide alarm creators with added confidence of relying on trusted backups to make sure that they will not miss an alarm.

With a "group alarm," a user creates an alarm for a group of participants. When invited, embodiments alert each participant via a notification, and the participant can accept or decline their participation. When the alarm goes off, embodiments alert all participants who accepted the invitation simultaneously. Each participant can then acknowledge, snooze, or withdraw participation in the alarm. The alarm creator and optionally all participants can then see the response of every participant in real-time. This innovative two-step process provides the alarm creator and participants with a fine-grained mechanism to manage and coordinate events.

In the same or alternative embodiments, alarm creators can create "buddy alarms" for other users. A buddy alarm is like a personal alarm, except that the alarm creator takes on the backup role. Particularly, the alarm creator creates an alarm and invites a "buddy." The buddy can accept or decline participation in the buddy alarm. If the buddy accepts the alarm, embodiments alert the buddy of the alarm first. If the buddy does not mark the alarm as "done" within a certain amount of time, embodiments alert the alarm creator, so that they can remind the buddy (e.g., by chat, SMS message, phone call, etc.) to address the task that is the subject of the alarm. In embodiments, a buddy alarm cannot be dismissed until the buddy marks it as "done." Buddy alarms provide alarm creators with added confidence that a buddy will not miss an alarm.

A "team alarm" is similar to a group alarm, except that any participant can mark the alarm as done. As with the group alarm, the creator of a team alarm can invite participants to, for example, address a particular task. When invited, embodiments alert each participant via a notification, and the participant can accept or decline their participation. When the alarm goes off, embodiments alert the alarm creator and the participants simultaneously. Team alarms can be marked as done by the alarm creator or any of the participants. When the creator or any participant marks the alarm as done, embodiments notify the creator and all participants accordingly. Team alarms provide teams with added confidence that they will not miss an alarm that can be addressed by any member of the team.

Embodiments of the invention include other functionality described in more detail below.

BRIEF DESCRIPTION OF THE DRAWINGS

The invention is explained in further detail, and by way of example, with reference to the accompanying drawings wherein.

DETAILED DESCRIPTION

In the following description, for purposes of explanation rather than limitation, specific details are set forth such as the particular architecture, interfaces, techniques, etc., to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Figure 1:
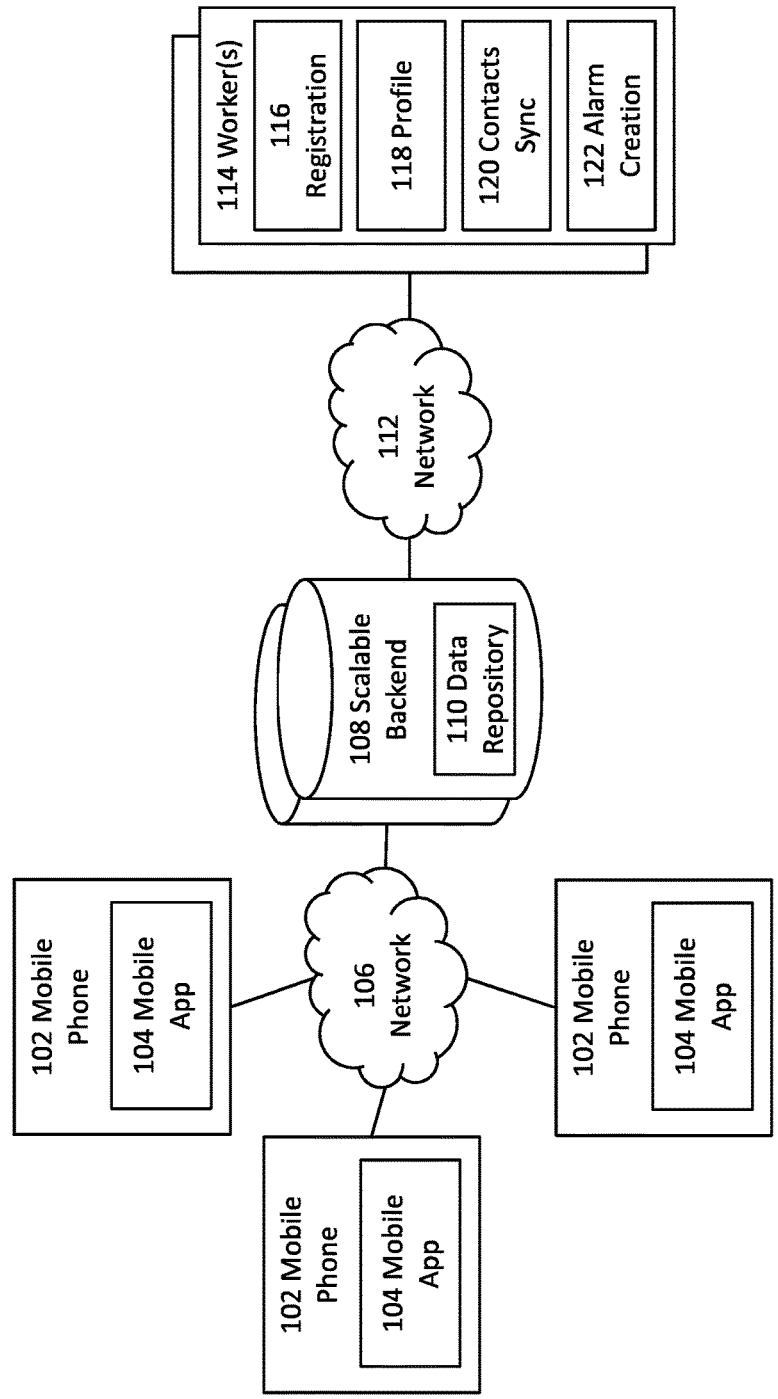
FIG. 1 illustrates a block diagram of an exemplary embodiment of a multi-user, multi-device alarm system.

FIG. 1 is a high-level block diagram of an exemplary embodiment of a multi-user, multi-device alarm system, in accordance with the present invention. Embodiments of the multi-user alarm system 100 include users of mobile phones 102, which may be running any OS type (e.g., Apple iOS, Google Android). Mobile phone 102 includes a mobile app 104, which comprises software and a corresponding user interface for creating, reviewing, and managing alarms, responding to alarm participation requests, and alerting users to alarms that go off. Mobile app 104 is a software application written in JavaScript or another programming language supported by mobile phones 102 and interacts with the scalable backend 108. A user can install the mobile app 104 on mobile phone 102 via well-known providers of mobile applications.

Mobile phones 102 are connected to a network 106 (e.g., using a cellular or WiFi interface), which in turn connects mobile phones 102 to scalable backend 108 (e.g., Google Firebase). Network 106 may include any collection of local and public networks, including the Internet. The scalable backend 108 includes a data repository 110 and provides services such as authentication, real-time database, file storage, and analytics. The mobile app 104 uses these services to, for example, authenticate users, store user data and files, and track user actions. The real-time database service provided by scalable backend 108 is responsible for synchronizing data among its connected clients. All instances of the mobile app 104 are clients of the real-time database.

Embodiments of the multi-user alarm system 100 also execute background tasks such as sending push notifications to mobile phones 102, creating thumbnails of profile pictures uploaded by users, etc. In some embodiments, workers 114 are responsible for these background tasks, and there is a different worker for each kind of background task. Workers 114 may be implemented as software modules operating on a server computer. The server computer is connected to network 112, which in-turn connects it to the scalable backend 108. Network 112 may include any collection of local and public networks, including the Internet. Each worker 114 is also a client of the real-time database running on scalable backend 108, and mobile app 104 creates tasks and receives results from workers 114 via the real-time database.

In embodiments, a user registers a mobile phone 102 with scalable backend 108 upon first launching mobile app 104. A user may register, for example, using a 2-factor authentication process by first inputting the phone number for mobile phone 102. This action triggers registration worker 116 to send a code via a text message or phone call to the phone number. The user may then input the code, or if the mobile app 104 is given permission to automatically detect the code, then use it in the mobile app 104. Once the registration worker 116 verifies that the user has entered the correct code, it assigns the user a unique ID, which associates the user with a particular profile that is maintained in data repository 110. In embodiments, users may edit their registered profiles via mobile app 104, which communicates with profile worker 118 to update the user's information in the scalable backend 108.

There are multiple benefits to using phone numbers for user registration. First, it permits users to migrate to different mobile phones 102 without losing any alarms or profile information. Second, if a user permits the mobile app 104 to access the user's address book in mobile phone 102, a worker 114 can identify contacts who also use mobile app 104 based on their phone numbers. This feature enables users to more easily create and participate in multi-user alarms with friends, family, and other people in their contact lists.

Figure 2:
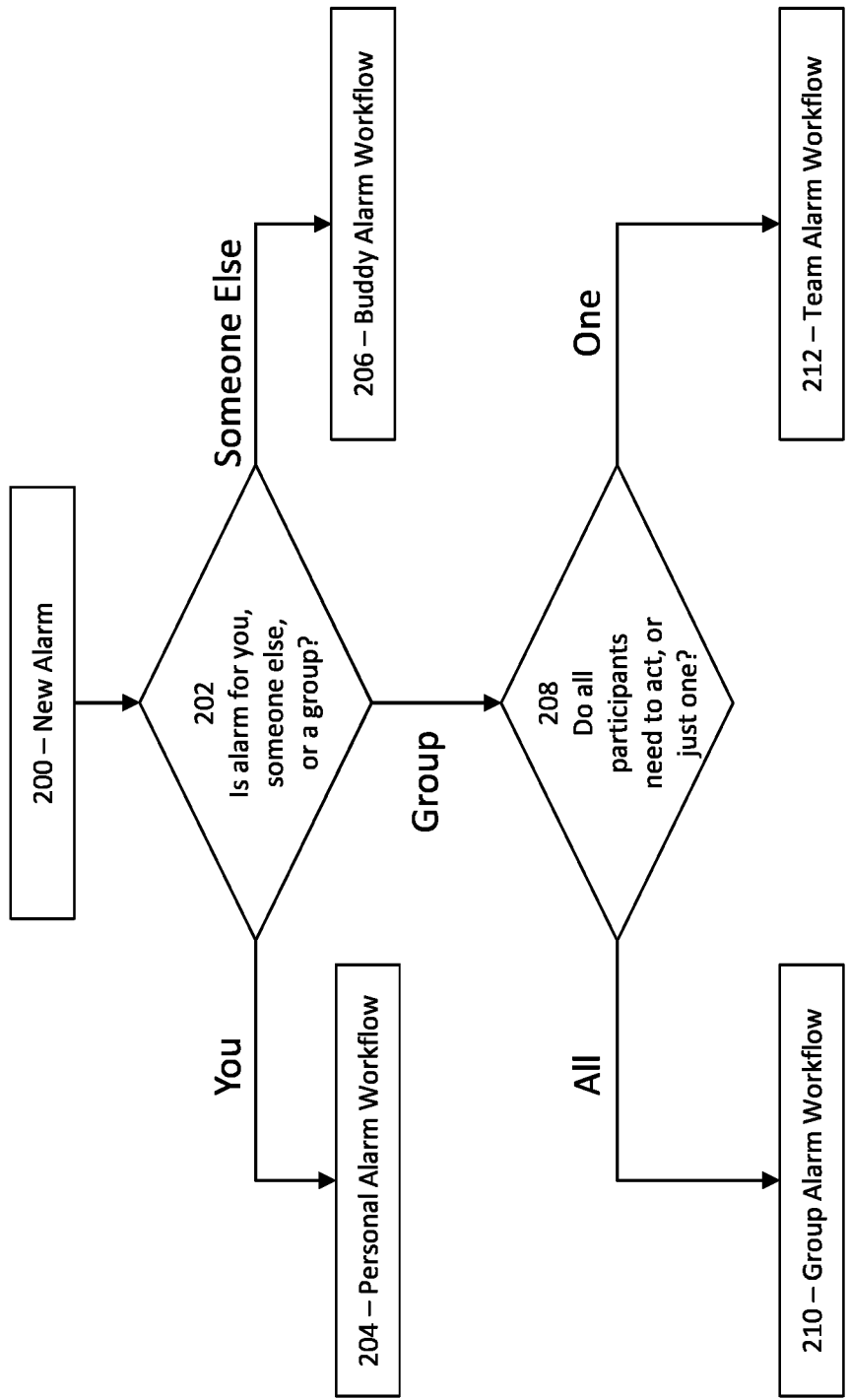
FIG. 2 illustrates a block diagram of a workflow for selecting an alarm type in a multi-user, multi-device alarm system.

Once a user has completed registration, she can create her first alarm. In embodiments, mobile app 104 guides the user to selecting the type of alarm (e.g., a personal alarm) that is most appropriate for the user's needs. FIG. 2 illustrates an example embodiment. The workflow begins with step 200, in which the user elects to create a new alarm within mobile app 104. Then, at step 202, mobile app 104 queries the user with several choices. For example, mobile app 104 may query the user to indicate whether the alarm is for "you" (i.e., the user), "someone else," or "a group." If the user selects "you," then mobile app 104 proceeds to step 204, which represents the personal alarm workflow described in FIG. 3 and in more detail below. If the user selects "someone else," then mobile app 104 proceeds to step 206, which represents the buddy alarm workflow described in FIG. 5 and in more detail below. And if the user selects a "group," then mobile app 104 queries the user to further indicate whether all participants in the group need to act (e.g., meet up at the movie theater), or whether only one participant in the group needs to act (e.g., feed the dog). Where all participants need to act, mobile app 104 proceeds to step 210, which represents the group alarm workflow described in FIG. 4 and in more detail below. And where only one participant needs to act, mobile app 104 proceeds to step 212, which represents the team alarm workflow described in FIG. 6 and in more detail below.

Personal Alarms

Figure 3:
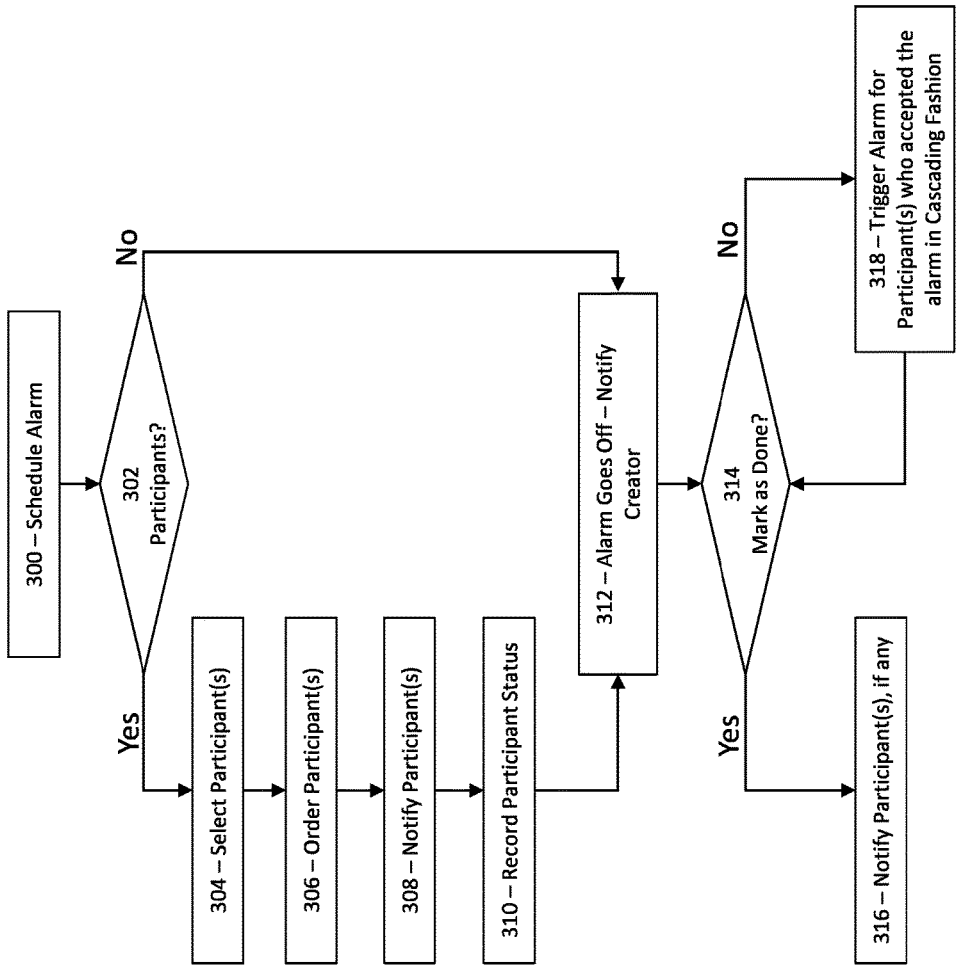
FIG. 3 illustrates a block diagram of a personal alarm workflow in a multi-user, multi-device alarm system.

FIG. 3 illustrates embodiments of the personal alarm workflow. The personal alarm workflow begins at step 300 with a user scheduling an alarm. Throughout this description, the user scheduling the alarm will be referred to as the "alarm creator" or just the "creator." Additionally, all references to "scheduling an alarm" refer to the process of setting parameters that are common in conventional alarm systems like setting the date, hour, minute, AM/PM, snooze duration, if and how often the alarm will repeat, and the sound to output (e.g. buzzer, ringtone, etc.) when the alarm goes off. For example, at step 300, the creator might use her mobile app 104 to schedule an alarm to repeat every Monday at 6:00 AM by playing the creator's favorite song. The alarm parameters may also include a title, subject, action item, or other descriptive text. In embodiments, the creator's mobile app 104 stores information about the alarm locally on mobile phone 102 and also transmits this information to scalable backend 108. Scalable backend 108, in turn, assigns alarm creation worker 122 to create a new alarm based on the corresponding information.

At step 302, the creator can choose to add participants to the alarm. With respect to personal alarms, a participant can be thought of as a "backup." For example, if the creator regularly sleeps through her 6:00 AM alarm, she can assign participants (e.g., her sister) to help ensure that she wakes up on time. In embodiments, the creator selects one or more participants at step 304 from a list of contacts who also use the mobile app. The creator may also select one or more participants who are not currently using the mobile app, and worker 114 may contact the participant (e.g., via SMS message or email) with an invitation to install the mobile app.

If the creator adds two or more participants at step 304, the creator may select an order for the participants at step 306 via mobile app 104. The order defines the sequence in which system 100 will notify participants if the creator fails to acknowledge the alarm when it goes off. In embodiments, the creator can rearrange the order of participants at any time before the alarm goes off via mobile app 104.

After setting the order, the workflow proceeds to step 308, at which a worker 114 notifies each participant (via scalable backend 108) that he or she has been added to a new alarm. Worker 114 notifies a participant by sending a message to the participant's mobile phone 102 running mobile app 104. The message includes information about the creator and the scheduled alarm. In embodiments, the message prompts each participant to accept or decline to participate in the alarm. At step 310, each participant's mobile app 104 records the participant's status (i.e., accepted or declined) and transmits this information to scalable backend 108, where the corresponding alarm is updated by a worker 114. The creator can then see each participant's status for the alarm within her mobile app 104. For example, mobile app 104 may indicate each participant's status as "undecided" (i.e., no response), "accepted," or "declined."

At step 312, the scheduled alarm goes off, and the creator's mobile app 104 alerts the creator according to the selected alarm parameters (e.g., by playing the creator's favorite song). At step 314, the creator must acknowledge the alarm (i.e., mark the alarm as "done" via mobile app 104) within some predefined window of time (e.g., 1 minute). In embodiments, the window may be fixed or configured by the creator when scheduling the alarm. If the creator marks the alarm as done within the window, then worker 114 notifies the participants at step 316 that the creator acknowledged the alarm. If the creator fails to mark the alarm as done within the window, then at step 318, worker 114 notifies the first participant's mobile app 104. The first participant's mobile app 104 then alerts the first participant according to the alarm parameters. In embodiments, each participant may personalize certain alarm parameters such as the alarm sound. The first participant can then attempt to notify the creator that she missed her alarm (e.g., by chatting with her via the mobile app, calling her on the phone, sending an SMS message, or visiting her in person). If the first participant successfully notifies the creator, the creator marks the alarm as done, and worker 114 will notify all participants accordingly at step 316. If the creator fails to mark the alarm as done within the predefined window of time at step 314, then worker 114 notifies the next participant in the group of participants at step 318. The workflow continues by notifying participants in a cascading fashion until the creator marks the alarm as done, at which point worker 114 notifies all participants accordingly at step 314.

In embodiments, the creator can mark the alarm as done at any time, and the process will immediately transition to step 316. In the same or alternative embodiments, participants can also mark the alarm as done if they are able to reach the creator. If neither the creator nor any participant marks the alarm as done, then in embodiments, the workflow will return to step 312, and the creator's mobile app 104 will alert the creator according to the alarm parameters.

Group Alarms

Figure 4:
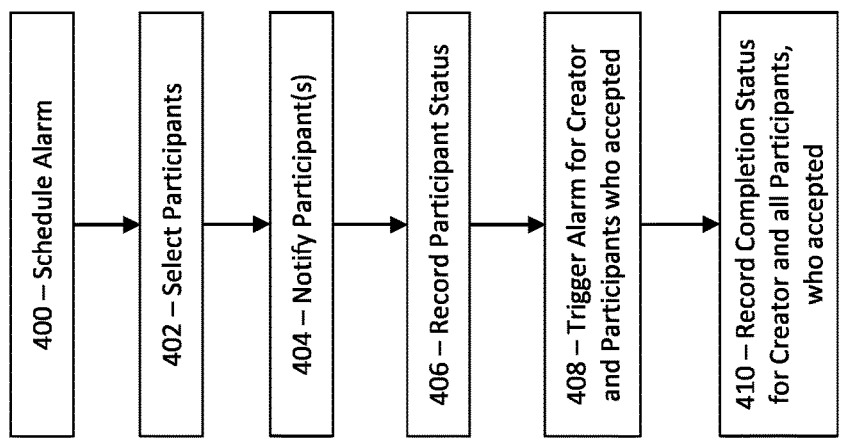
FIG. 4 illustrates a block diagram of a group alarm workflow in a multi-user, multi-device alarm system.

FIG. 4 illustrates embodiments of a group alarm workflow. A group alarm requires a creator and at least one participant. It is similar to the personal alarm, except that the alarm alerts the creator and all participants simultaneously. Group alarms may be useful, for example, when two or more people each need to perform a particular task (e.g., complete a work assignment) or collaborate for an event (e.g., meet up for a movie). The workflow begins at step 400 with the creator scheduling an alarm via mobile app 104. At step 402, the creator selects one or more participants in the same manner as described above with respect to personal alarms. At step 404, worker 114 notifies each participant (via scalable backend 108) that he or she has been added to a new alarm. As with personal alarms, worker 114 notifies a participant by sending a message to the participant's mobile phone 102 running mobile app 104. The message includes information about the creator and the scheduled alarm. In embodiments, the message prompts each participant to accept or decline to participate in the alarm. At step 406, each participant's mobile app 104 records the participant's status (i.e., accepted or declined) and transmits this information to scalable backend 108, where a worker 114 updates the alarm accordingly. The creator can then see each participant's status (e.g., undecided, accepted, or declined) for the alarm within her mobile app 104.

At step 408, the scheduled alarm goes off, and the mobile app 104 for the creator and each participant who has accepted the alarm alerts the respective users according to the alarm's parameters. In embodiments, each participant may personalize alarm parameters such as the alarm sound.

Finally, at step 410, the creator and each participant update their statuses (i.e., to indicate whether they completed the task or will collaborate in the event) via their respective mobile apps 104. Mobile apps 104 record this information and transmit it to scalable backend 108, where a worker 114 updates the alarm accordingly. Scalable backend 108 then shares the completion statuses with the creator and all participants so that all parties can view up-to-date status information for each other.

Buddy Alarms

Figure 5:
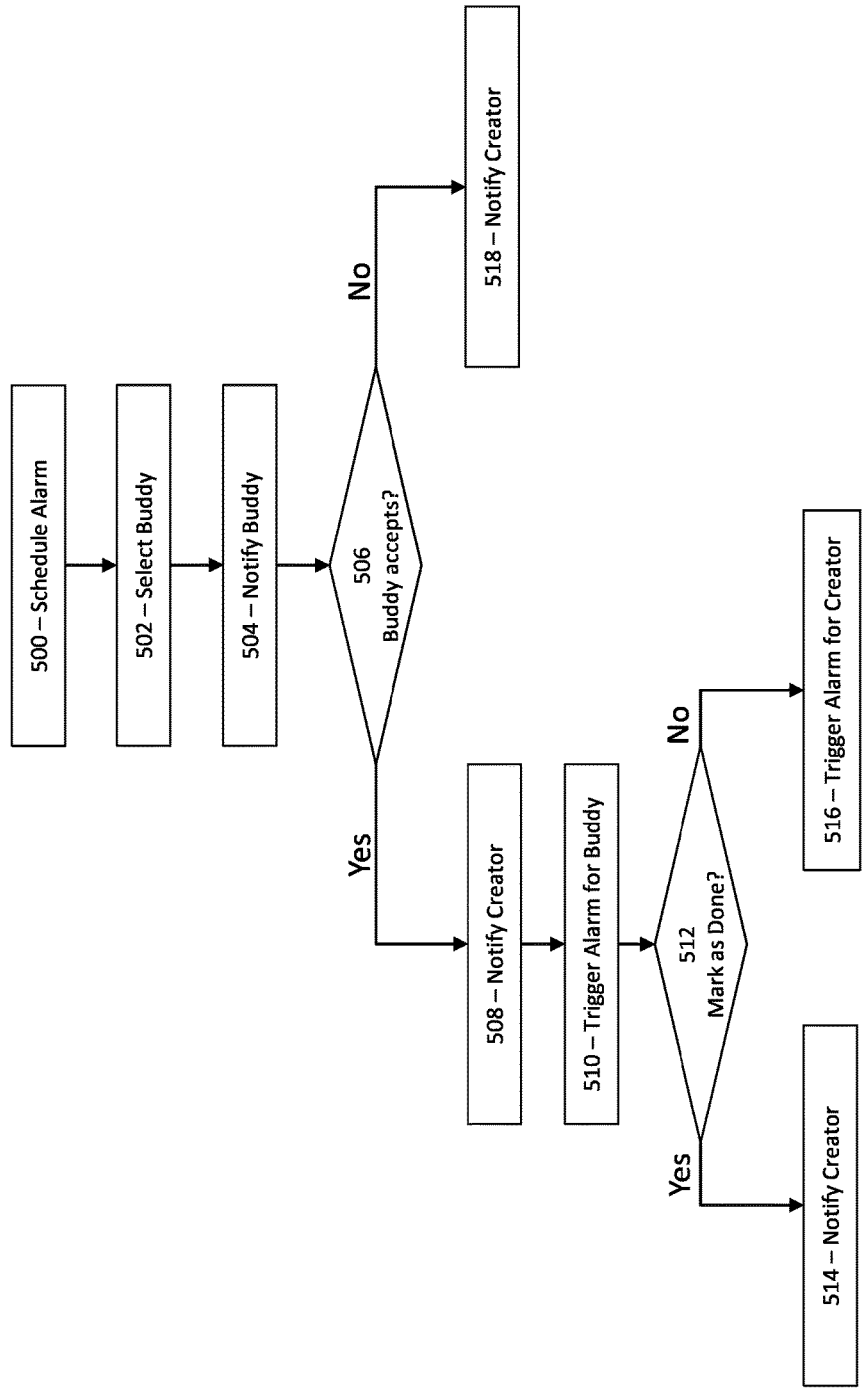
FIG. 5 illustrates a block diagram of a buddy alarm workflow in a multi-user, multi-device alarm system.

FIG. 5 illustrates embodiments of a buddy alarm workflow. A buddy alarm permits the creator to schedule an alarm for someone else (i.e., the "buddy"). For example, a person could schedule an alarm for an aging parent to remind them to take their medicine. Or an assistant could schedule an alarm for a manager to remind them of an upcoming meeting.

The workflow begins at step 500 with the creator scheduling an alarm via mobile app 104. At step 502, the creator selects a buddy similar to how she would select a participant in a personal alarm or group alarm. At step 504, worker 114 notifies the buddy that the creator has scheduled a new alarm for the buddy. Worker 114 notifies the buddy by sending a message to the buddy's mobile phone 102 running mobile app 104. The message includes information about the creator and the scheduled alarm. In embodiments, the message prompts the buddy at step 506 to accept or decline the new alarm, and the buddy's mobile app transmits the buddy's status (i.e., accepted or declined) to scalable backend 108, where it is updated by a worker 114.

If the buddy accepts the alarm, worker 114 notifies the creator (via scalable backend 108) accordingly at step 508 by transmitting a message to the creator's mobile app 104. At step 510, the scheduled alarm goes off, and the mobile app 104 for the buddy alerts the buddy according to the alarm's parameters. In embodiments, the buddy may personalize alarm parameters such as the alarm sound. At step 512, the buddy must acknowledge the alarm (i.e., mark the alarm as "done" via mobile app 104) within some predefined window of time (e.g., 1 minute). In embodiments, the window may be fixed or configured by the creator when scheduling the alarm. If the buddy marks the alarm as done within the window, then worker 114 notifies the creator at step 514 that the buddy acknowledged the alarm. If the buddy fails to mark the alarm as done within the window, then at step 516, worker 114 notifies the creator's mobile app 104 accordingly. The creator's mobile app 104 then alerts the creator according to the alarm parameters. The creator can then attempt to notify the buddy that he missed his alarm (e.g., by chatting with him via the mobile app, calling him on the phone, sending an SMS message, or visiting him in person). In embodiments, the alarm remains pending until the buddy marks it as done. In the same or alternative embodiments, the creator can also mark the alarm as done if she successfully reaches the buddy.

Returning to step 506, if the buddy declines the new alarm, worker 114 notifies the creator accordingly at step 518 by transmitting a message to the creator's mobile app 104. The creator can then choose to select a different buddy at step 502 and repeat the process.

Team Alarms

Figure 6:
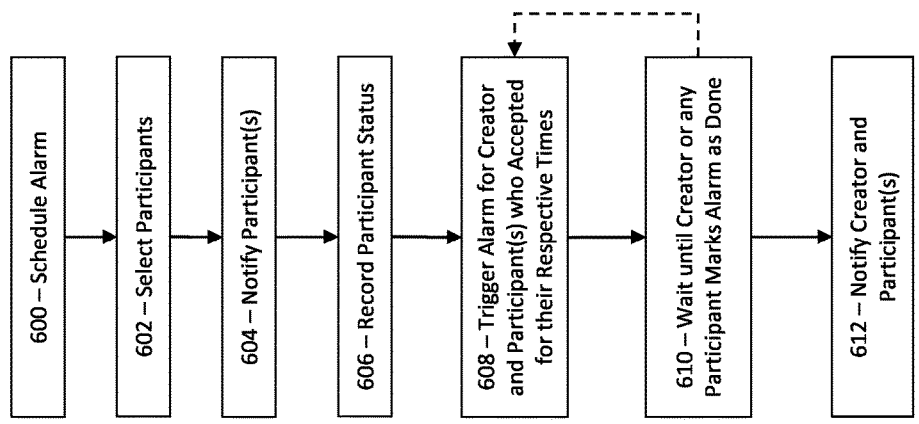
FIG. 6 illustrates a block diagram of a team alarm workflow in a multi-user, multi-device alarm system.

FIG. 6 illustrates embodiments of a team alarm workflow. A team alarm permits a creator to schedule an alarm for a team of participants. When the team alarm goes off, all participants and the creator are notified simultaneously. Then, when any of the participants or the creator marks the alarm as done, the alarm will be marked as done for the entire team. Team alarms may be useful, for example, when a group of colleagues or family members have a task that can be completed by anyone in the group. For example, a team of nurses in a hospital might use team alarms to remind them to give medicines to their patients. When any nurse gives the medicine, the alarm can be marked as done for all of the nurses. Similarly, a family might use team alarms for common chores like taking out the trash on Wednesday nights or feeding the dog each morning. When one family member completes the task, it is marked done for all family members.

The team alarm workflow begins at step 600 with the creator scheduling a new alarm via mobile app 104. At step 602, the creator selects one or more participants in the same manner as described above with respect to personal and group alarms. At step 604, worker 114 notifies each participant that he or she has been added to a new team alarm. As with personal and group alarms, worker 114 notifies a participant by sending a message to the participant's mobile phone 102 running mobile app 104. The message includes information about the creator and the scheduled alarm. In embodiments, the message prompts each participant to accept or decline participation in the alarm. At step 606, each participant's mobile app 104 records the participant's status (i.e., accepted or declined) and transmits this information to scalable backend 108, where worker 114 updates the corresponding alarm. The creator can then see each participant's status (e.g., undecided, accepted, or declined) for the alarm within her mobile app 104.

At step 608, the scheduled alarm goes off, and the mobile app 104 for the creator and each participant who has accepted the alarm alerts the respective user according to the alarm's parameters. In embodiments, each participant may personalize alarm parameters such as the alarm sound. Unlike for group alarms, only one member of the team (i.e., the creator and all participants) must respond to the alarm. At step 610, each team member's mobile app 104 waits for someone to mark the alarm as done. In embodiments, if no team member marks the alarm as done within some predefined window of time (e.g., 5 minute), the workflow may return to step 608 and trigger another alarm alert. In embodiments, the window may be fixed or configured by the creator when scheduling the alarm. When any member of the team marks the alarm as done, that member's mobile app 104 transmits a message to scalable backend 108. Then at step 612, worker 114 notifies the team that the member acknowledged the alarm, i.e., completed the designated task.

In the same or alternative embodiments, a creator may schedule a team alarm to go off in a cascading manner (i.e., one participant at a time) instead of going off simultaneously for all participants. In such embodiments, the creator may define an order of participants similar to how she would select an order for a personal alarm. In this manner, the team alarm would first go off for the creator (or optionally the first participant if the creator elected not to participate or did not want to be first). If the creator (or first participant) fails to mark the alarm as done within some predefined window of time (e.g., 1 minute), then worker 114 notifies the next participant in the order. The process repeats by notifying participants in a cascading fashion until the creator or participant marks the alarm as done at step 610, at which point worker 114 notifies the creator and all participants accordingly at step 612. In the same or alternative embodiments, instead of cascading to the next participant after some predefined window of time has elapsed, the creator may schedule a specific alarm time for each participant. For example, the creator may schedule the alarm to go off for herself first at 6:00 am, for participant 1 at 6:05 am, for participant 2 at 6:12 am, etc. In other words, the time between participant alarms does not have to be constant. The alarm will then go off for the participants at their respective times at 608 until the creator or participant marks the alarm as done at step 610. Worker 114 then notifies the creator and all participants accordingly at step 612.

Other Embodiments

Embodiments of the invention may include combinations of one or more additional features described below. One such feature concerns communications among creators and participants. Creators and participant may wish to share comments about alarms to indicate, for example, reasons for rescheduling alarms or updating their participation status. Embodiments enable users to "chat" within mobile app 104. The chat functionality permits users to enter comments that are visible to the creator and participants. Worker 114 may notify the creator and participants when any one of them enters a new comment about a particular alarm.

As discussed above, if a user permits mobile app 104 to access the user's address book in mobile phone 102, a worker 114 (e.g., contacts sync worker 120) can identify contacts who also use mobile app 104 based on their respective phone numbers. In embodiments, when a user first installs mobile app 104, any contacts in mobile phone 102 who also use mobile app 104 will automatically appear in a contacts list. Likewise, the user who just installed mobile app 104 will also appear in the contact lists of other users who have that user in their address book. In embodiments, contacts sync worker 120 regularly synchronizes user contact lists with scalable backend 108 to ensure it has the most up-to-date information.

Embodiments enable users of mobile app 104 to create contact groups. A user can create contact groups to easily add multiple participants to personal, group, and team alarms. When a creator creates a group, she may, for example, define a group name, select a group photo, and choose the contacts that should form the contact group. The creator is automatically added as a member of the contact group, and may receive special privileges as an administrator of the contact group. In embodiments, participants see all contact groups to which they belong. Further, participants may make changes to contact groups. Some changes may be visible only to them (e.g., changing the group name or representative photo), and other changes may affect all members (e.g., adding more members to the contact group). In embodiments, contact group members may leave a group at any point, but only the creator can remove other members from the group. When scheduling a new alarm (or editing an existing alarm) the creator can select a contact group as a participant. When this happens, all members of the contact group will be added as participants to the alarm.

In embodiments, only creators can edit scheduled alarms. In alternative embodiments, creators can assign editing privileges to specific contacts so that certain participants can also edit scheduled alarms. Embodiments permit creators and authorized users to edit various properties of a scheduled alarm such as the alarm's name, date, time, repetition, and participants. Worker 114 may notify participants of certain critical changes, e.g., a change in time, and in such cases, participants may be queried to confirm their participation in the revised alarm. Editing operations may also include deleting old or inactive alarms.

In order to maintain synchronization with scalable backend 108, many embodiments require access to network 106. Some embodiments, however, permit offline operations. For example, users may create and edit alarms offline. Mobile app 104 saves all such operations locally on mobile phone 102 and remembers which ones have not been synced with scalable backend 108. Once mobile phone 102 reacquires access to network 106, mobile app 104 shares the operations with scalable backend 108 until all alarms are synchronized.

In embodiments, users can block other users from adding them as participants or buddies to alarms. In embodiments, the user doing the blocking is also prevented from adding a blocked user as a participant or buddy. Users can unblock other users at any time.

When a creator schedules a new alarm, the time of the alarm corresponds to the creator's time zone. In embodiments, if the creator adds a buddy or one or more participants in different time zones, mobile app 104 will automatically adjust the time for each time zone so that alarms will go off at the same mean time for all participants (e.g., 8 pm EST=5 pm PST). In the same or alternative embodiments, the creator can disable this feature so alarms go off relative to each time zone (e.g., 8 pm EST=8 pm PST).

In embodiments, a user of mobile app 104 may develop a reputation score based on one or a combination of factors such as the number of alarms the user created, the number of alarms in which the user has participated, the ratio of times that the user has marked an alarm as done compared to the times that the user has ignored an alarm, and the number of times that a user has personally reminded another user of an alarm. A user may accrue reputation points for behaviors that indicate participation in alarms and reliability in responding to alarms. In embodiments, the reputation score represents a user's accrued reputation points. The score is also visible to other users and permits them to quickly assess the participation rate and reliability of their peers.

In embodiments, creators may quickly send a "thank you" to any participant(s) who reminded the creator of a personal alarm, participated in a group alarm, and/or marked a team alarm as done. Participants may accrue reputation points for each "thank you" they receive.

In the same or alternative embodiments, a user of mobile app 104 may accrue labels based on past behavior that is indicative of that user's participation rate and reliability. For example, a user who reliably participates in alarms late at night might accrue a "night owl" label, while a user who reliably participates in morning alarms might accrue an "early bird" label. Such labels are visible to other users (e.g., as badges) and permit the other users to assess the participation rate and reliability of a user before adding that user as a participant to an alarm. In embodiments, labels may impact a user's reputation score or be independent from the calculation of the reputation score. Creators may filter their contacts based on reputation scores and/or labels when creating a new alarm.

In embodiments, mobile app 104 automatically detects when a user is participating in two or more alarms that go off around the same time. For example, if a user is participating in two alarms set to go off within some threshold (e.g., 5 minutes) of each other, the user may not have enough time to participate in both. In such cases, mobile app 104 can notify the user of the potentially conflicting alarms and query the user if changes are needed.

In the embodiments above, the creator and participants are described as human characters. In these and other embodiments, however, the creator and/or one or more participants may be replaced with automated means. For example, the creator could be part of an automated trouble ticketing system. When the system receives a new trouble ticket, it could be configured to automatically schedule an alarm (e.g., a team alarm) for a group of technicians. Likewise, an automated system could be one or more of the participants, i.e., when an automated system receives a participation request and a subsequent alarm, it could be configured to take certain actions (e.g., turn on a light). For example, an automated assistant like APPLE's SIRI or AMAZON's ALEXA could take the place of a creator or a participant and be configured to take actions on behalf of one or more users.

The foregoing merely illustrates the principles of the invention. It will thus be appreciated that those skilled in the art will be able to devise various arrangements which, although not explicitly described or shown herein, embody the principles of the invention and are thus within its spirit and scope. These and other system configuration and optimization features will be evident to one of ordinary skill in the art in view of this disclosure, and are included within the scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements, and can include an immeasurable number of elements.

We claim:

1. A computer-implemented method for creating a personal alarm and alerting participants on a mobile device, comprising:

receiving, via a user interface on the mobile device, input from a creator for:
  scheduling an alarm, wherein the alarm includes at least an alarm time,
  selecting one or more participants for the alarm, and selecting an order of the participants;
sending an invitation to respective mobile devices for each of the participants;
receiving a response from each of the participants, wherein the response indicates whether each participant accepts or declines the invitation;
alerting the creator, via the user interface, at the alarm time;
if the creator fails to mark the alarm as done within a predefined time period, sending a first notification to the respective mobile device of a first participant of the one or more participants;
restarting the time period;
if the creator again fails to mark the alarm as done within the time period, and if there is a second participant of the one or more participants, sending a second notification to the respective mobile device of the second participant; and
for each additional participant of the one or more participants:
  restarting the time period; and
  if the creator fails to mark the alarm as done within the time period, and if there is a next additional participant of the one or more participants, sending an additional notification to the respective mobile device of the next additional participant.

2. The method of claim 1, further comprising:
receiving, via the user interface, input from a creator to select the duration of the time period.

3. The method of claim 1, further comprising:
receiving, via the user interface, a chat message from the first participant as a reminder for the alarm.

4. The method of claim 1, wherein selecting one or more participants comprises selecting the one or more participants from a contacts list, and wherein the contacts list comprises the intersection of the creator's mobile phone address book and other registered users.

5. The method of claim 1, wherein selecting one or more participants comprises selecting a predefined group of participants.

6. The method of claim 1, further comprising:
sending, via the user interface, a thank you message to the first participant; and
awarding the first participant one or more reputation points.

7. The method of claim 1, wherein one of the one or more participants is an automated assistant.

* * * * *